US012576965B2

(12) United States Patent　　　　(10) Patent No.:　US 12,576,965 B2

Ruspa　　　　　　　　　　　　　(45) Date of Patent:　　　Mar. 17, 2026

(54) VERTICAL TAKE-OFF AND LANDING AIRCRAFT

(71) Applicant: HPG S.R.L., Milan (IT)

(72) Inventor: Maria Giuseppina Ruspa, Milan (IT)

(73) Assignee: HPG S.R.L., Milan (IT)

( * ) Notice: Subject to any disclaimer, the term of this patent is extended or adjusted under 35 U.S.C. 154(b) by 0 days.

(21) Appl. No.: 18/871,195

(22) PCT Filed: Jun. 20, 2023

(86) PCT No.: PCT/IB2023/056365

§ 371 (c)(1),
(2) Date: Dec. 3, 2024

(87) PCT Pub. No.: WO2023/248121

PCT Pub. Date: Dec. 28, 2023

(65) Prior Publication Data

US 2025/0340293 A1　　Nov. 6, 2025

(30) Foreign Application Priority Data

Jun. 20, 2022　(IT) ........................ 102022000013030

(51) Int. Cl.
| *B64C 29/02* | (2006.01) |
| *B64C 27/52* | (2006.01) |
| *B64D 25/00* | (2006.01) |
| *B64D 31/16* | (2024.01) |
| *B64D 33/10* | (2006.01) |
| *B64D 35/06* | (2006.01) |

(52) U.S. Cl.
CPC .............. *B64C 29/02* (2013.01); *B64C 27/52* (2013.01); *B64D 25/00* (2013.01); *B64D 31/16* (2024.01); *B64D 33/10* (2013.01); *B64D 35/06* (2013.01); *B64D 2201/00* (2013.01)

(58) Field of Classification Search
CPC ......... B64C 29/02; B64C 27/52; B64D 25/00; B64D 33/10; B64D 31/16; B64D 35/06; B64D 2201/00
See application file for complete search history.

(56) References Cited

U.S. PATENT DOCUMENTS 10,597,153 B1 * 　3/2020　Schuller .................... B64C 3/16
2017/0284371 A1 * 10/2017　Gamble ................. F03D 17/00

* cited by examiner

*Primary Examiner* — Tye William Abell
(74) *Attorney, Agent, or Firm* — Flener IP & Business Law

(57) ABSTRACT

A vertical take-off and landing aircraft of the tail-sitting type comprises a cockpit integrated into a body having delta wings in the rear section with respect to the cockpit and a propulsion system placed in the front section with respect to the cockpit. The propulsion system includes at least two coaxial counter-rotating propellers put into rotation by at least two electric engines powered by rechargeable batteries.

23 Claims, 5 Drawing Sheets

40

X

45B

47

44A

43B

41

47

70

7

20

45

44B

43A

45

71

45A

VERTICAL TAKE-OFF AND LANDING AIRCRAFT

FIELD OF THE INVENTION

The present invention concerns a vertical take-off and landing aircraft, also known by the acronym VTOL (Vertical Take Off and Landing). In particular, the invention concerns a VTOL aircraft of the tail-sitting type.

PRIOR ART

In the technical field of reference, various solutions for realizing vertical take-off and landing aircraft are known.

Recently, alongside aircraft with turboprop propulsion, solutions using hybrid or electric motorisations have been developed.

Aircraft of this type are already known in the art. In the early fifties of the last century, prototypes of VTOL aircraft with turboprop propulsion with two counter-rotating propellers had been developed in the United States, such as the XFV "Salmon" model of the Lockheed Corporation and the XFY "Pogo" model of Convair. The latter had a delta wing and two vertical planes, one on the back and the other in the belly, and managed to carry out vertical take-off and landing tests, as well as high-speed horizontal flight tests and tests of transition from vertical flight to horizontal flight and vice versa.

However, several problems used to arise, especially in the control of the landing phase since, landing with the tail, the pilot had little visibility of the ground and, consequently, a poor perception of the distance that separated him from the ground. In addition, it was particularly difficult to modulate the power of the turboprop engines and/or the pitch of the counter-rotating propellers during landing. This could cause serious accidents with serious consequences for the pilot.

For these reasons, the projects of the VTOL aircraft mentioned above have been abandoned.

Further examples of such aircraft are described in GB 2582133 A, U.S. Pat. No. 10,597,153 B1 or WO 2017/052396.

These documents describe VTOL aircraft in which propulsion is achieved by means of a pair of counter-rotating propellers.

However, the Applicant has noted that in this type of known aircraft the total unladen mass of the aircraft represents an important limiting element.

The adoption of counter-rotating propellers represents in fact an efficient and compact solution that, however, is partially nullified in the solutions known by the use of hybrid or electric propulsion systems.

The presence of the electric motorisation, of the battery pack, of the drive systems, can in fact significantly affect the mass of the aircraft, with a consequent limitation of the performance of the same, in particular in terms of autonomy.

The Applicant has also observed that a further important limitation element of the known solutions is represented by the definition of an optimized structure of the aircraft that allows to obtain the right compromise between aircraft mass, manoeuvrability of the aircraft both during take-off and landing, both in the phases of flight, simplicity of assembly and, last but not least, costs.

In fact, it should be noted that these aircraft have been made in an essentially prototypical manner and are not suitable for mass production.

SUMMARY OF THE INVENTION

The technical problem underlying the present invention is therefore to make available a vertical take-off and landing aircraft of the tail-sitting type structurally and functionally designed to remedy at least in part one or more of the drawbacks complained about with reference to the cited known technique.

Within the scope of this problem, an object of the present invention is to provide a vertical take-off and landing aircraft of the electrically propelled tail-sitting type which is provided with an improved autonomy with respect to the known solutions.

A further object of the present invention is to provide a vertical take-off and landing aircraft of the electrically propelled tail-sitting type, in which the mass is relatively contained.

An object of the present invention is to provide a vertical take-off and landing aircraft of the electrically propelled tail-sitting type which is provided with a structure capable of permitting at least limited mass production.

A further object of the present invention is to make available a vertical take-off and landing aircraft of the tail-sitting type which is easy to control in all phases of vertical, horizontal phases and in the phases of transition from vertical flight to horizontal flight, and vice versa.

Another object of the present invention is to make available a vertical take-off and landing aircraft of the tail-sitting type having a high degree of safety even in the event of possible failures or malfunctions.

A further object of the present invention is to make available a vertical take-off and landing aircraft of the tail-sitting type which is easy and inexpensive to realize.

This problem is solved and at least one of these objects are at least partially achieved by the invention, in a first aspect, by means of a vertical take-off and landing aircraft of the tail-sitting type comprising a cockpit integrated in a body having delta wings, preferably in the rear section with respect to the cockpit, and a propulsion system preferably placed in the front section with respect to the cockpit.

It will be appreciated that the indications "front" and "rear" relating to the components of the aircraft are to be understood with respect to the aircraft in the position in which it is placed during horizontal flight.

In some embodiments of the present invention, the propulsion system includes at least one pair of coaxial counter-rotating propellers put into rotation by at least two respective pairs of distinct electric engines powered by rechargeable batteries.

The aircraft according to the present invention is thus particularly compact and can be provided with relatively low unladen mass, as well as being easy to control and can be realized in a simple and economical manner. In fact, the use of two distinct engines, each of which puts into rotation a respective propeller, makes it possible to avoid complex mechanical systems compared to the solutions in which only one engine is provided to drive both propellers with opposite rotations.

Preferably, the electric engines are direct current (DC)—powered brushless type engines and are installed in the aircraft with fixed windings and rotating casing.

In preferred embodiments, each engine comprises a respective rotating casing, each casing being directly connected to a respective propeller. In other words, said propellers are preferably in direct drive with the respective engine, without interposing gear reducers or other motion transmission systems.

Each casing is preferably integral with a respective propeller.

Advantageously said fixed windings define a single stator body of said electric engines.

The above characteristics each contribute to simplifying the mechanical connections to the two coaxial counter-rotating propellers and the electrical power connections to the engines.

Preferably, the aircraft comprises a pitch varying device of said propellers, said pitch varying device being preferably configured so as to individually vary the pitch of each of said propellers.

In this way it is possible to vary the propulsive thrust of the propellers without varying the number of revolutions of the same, therefore in the absence of gear reducers or other drive parts between engines and propellers. This allowing in particular to have a greater thrust during take-off/landing and a smaller thrust during flight, for the benefit of the aircraft's autonomy.

In some embodiments, the rechargeable batteries are solid state batteries, so as to ensure a high charging capacity with reduced weight.

Preferably, said propellers are coaxial with respect to an axis of rotation, said engines being aligned with respect to said axis of rotation, a second engine of said pair of engines being directly facing a first engine of said pair.

This makes it possible to simplify the electrical connections of the propulsion system, to the advantage of the assemblability of the aircraft. In addition, it makes it possible to realize a propulsion unit that can be easily assembled with the remaining parts of the aircraft.

In some embodiments, the aircraft comprises a battery housing body within which said batteries are housed, said housing body and said batteries forming a battery unit, always for the benefit of the simplicity of assembly of the aircraft and the possibility of realizing the same in series.

Preferably the aircraft comprises a shaft that develops parallel to the axis of rotation on which said stator units of said engines are supported.

In some embodiments, said shaft extends from the battery housing body, on which it is supported at a first end. Preferably said battery housing body is in turn supported on said cockpit.

According to one aspect of the invention, each propeller of said pair is supported on said shaft.

In some embodiments, said shaft is hollow so as to allow the passage of the electrical connections, not illustrated in the figure, which allow both to supply power to the engines, and to manage the control thereof.

In some embodiments, the aircraft comprises a cooling system configured to liquid cool the electric engines with the relative inverters and/or the rechargeable batteries, so as to make it more effective and safer to maintain the optimal operating temperature of the batteries and/or of the engines. The cooling can be carried out through a water or oil cooling system, in particular through oil for the cooling of the electrical propulsion systems, then for example a dielectric liquid capable of coming into contact with the electrical components of the same.

Advantageously, the cavity formed in the shaft also allows the ducts for the cooling system to be housed, causing the fluid to flow towards the windings of the electric engines.

In some embodiments, the aircraft comprises a nose placed in front of the two coaxial counter-rotating propellers. At least one ballistic safety parachute is preferably housed in the nose. This allows to ensure a high degree of safety in case of malfunctions in the propulsion system occur. In fact, in case of malfunction of the propulsion system, the ballistic parachute can be ejected to allow a braked descent of the aircraft with the tail oriented towards the ground.

Preferably said battery housing body, said cooling system and said propulsion system are aligned along the axis of rotation, and follow one another in that order along a direction running from the rear to the front of the aircraft.

In some embodiments, a first propeller of said pair is interposed between said cooling system and said first engine.

Preferably, said shaft comprises a second end projecting in axial direction with respect to a respective propeller of said pair, said nose being supported on said second end. This feature allows a simplified fixing of the nose.

In preferred embodiments, said cockpit, said battery unit and said propulsion system formed by propellers and engines are each made as a distinct component and are configured so as to be mounted in axial succession.

Preferably said cooling system is made as a distinct component with respect to said cockpit, said battery unit, and said propulsion system, and is configured so as to be mounted between said battery unit and said propulsion system along said axis of rotation.

It will be appreciated that the adoption of aligned components, combined with the absence of gear reducers and related transmission parts, further allows realizing individual modules that can be assembled through simple mechanical and electrical connections.

In one embodiment, one or more airbags arranged in the rear section of the body of the aircraft, and/or the cockpit are provided, to cushion the impact with the ground in the event of any emergency landing.

In one embodiment, the cockpit comprises at least two side-by-side seats. The two side-by-side seats comprise at least one tilting seat, preferably two tilting seats, with manually and/or automated adjustable rotation.

In some embodiments, said tilting seat being configured such that it rotates on command about an axis substantially perpendicular to said axis of rotation of said propellers and substantially parallel to the ground when the aircraft is resting on the ground in a take-off/landing configuration.

The cockpit may comprise at least one transparent tiltable shell, hinged in its front part to the body of the aircraft, to allow access of at least one pilot to one of the two side-by-side seats, and therefore reclosable in safety during the flight.

The aircraft according to the invention comprises a programmable control unit for controlling and adjusting one or more of:

the power of the two electric engines;

the rotation of said tilting seat;

the pitch of said propellers;

the state of charge of the batteries;

the flight attitude of the aircraft;

the phases of transition between vertical flight and horizontal flight; and the route to be followed by the aircraft.

At least the body of the aircraft according to the present invention is made with robust and lightweight materials, such as for example carbon fibres, aluminium or alloys thereof and titanium or alloys thereof.

In this description as well as in the accompanying claims, some terms and expressions are deemed to assume, unless otherwise expressly indicated, the meaning expressed in the following definitions.

With the expressions "substantially parallel" and "substantially perpendicular", in the context of the present invention, a possible deviation of ±10°, preferably ±5°, will be indicated with respect to a perfect parallelism and perpendicularity, respectively.

BRIEF DESCRIPTION OF THE DRAWINGS

Further characteristics and advantages of the present invention will become clearer from the following description, made by way of illustration and not limitation with reference to the accompanying drawings, in which.

DETAILED DESCRIPTION

Figure 1:
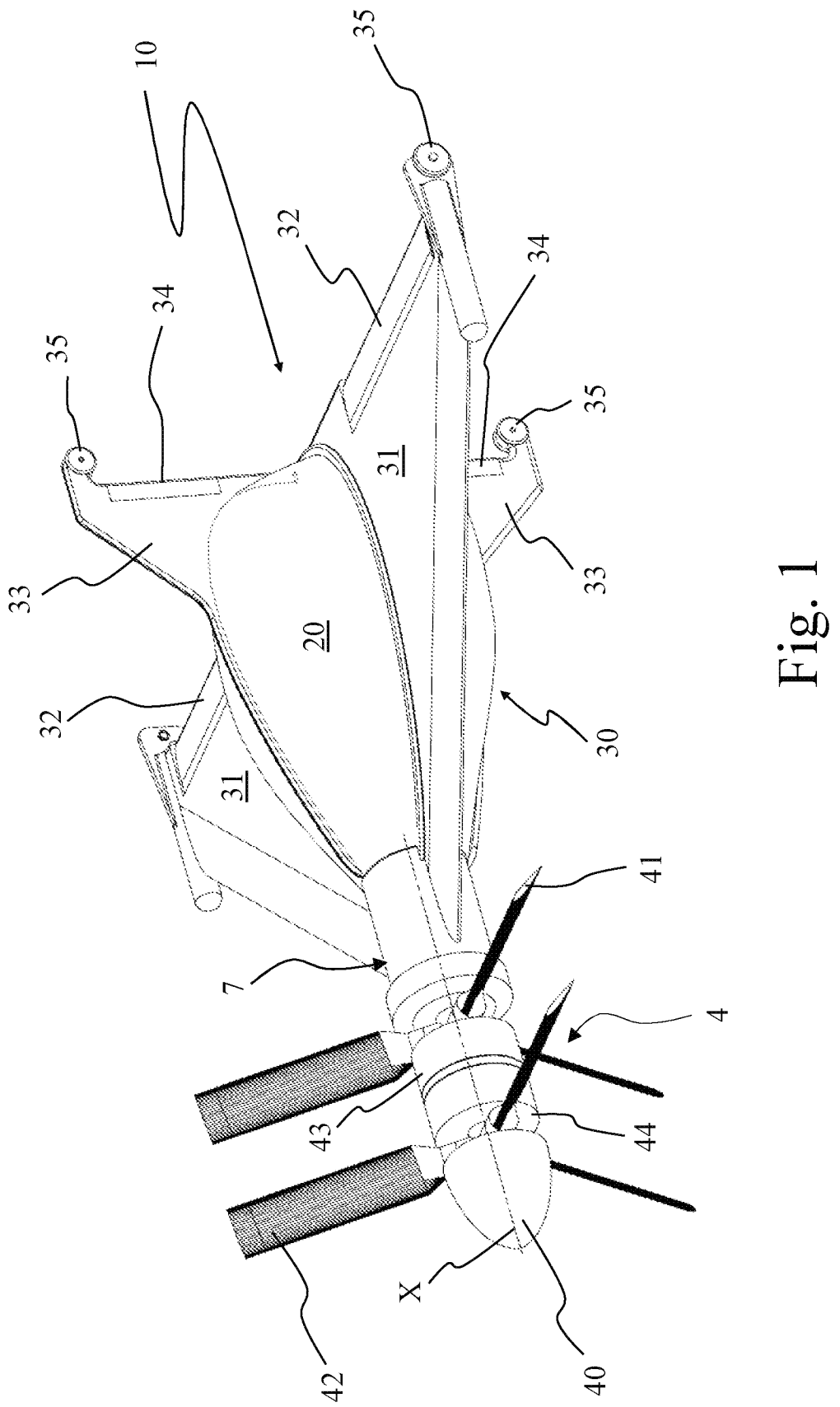
FIG. 1 is a perspective view of an aircraft in horizontal flight attitude according to an embodiment of the present invention.

With reference initially to FIG. 1 a vertical take-off and landing aircraft of the tail-sitting type according to an embodiment of the present invention is overall indicated with reference numeral 10. In FIG. 1 the aircraft 10 is represented in a horizontal flight attitude.

The aircraft 10 comprises a cockpit 20 integrated in a body 30 having delta wings 31 and provided with movable ailerons 32 in the rear section with respect to the cockpit 20. In the front section with respect to the cockpit 20 there is provided a propulsion system 4 which includes two coaxial counter-rotating propellers 41 and 42 put into rotation by two respective distinct electric engines 43 and 44. In preferred embodiments the propellers 41, 42 rotate with respect to a same axis of rotation X. In preferred embodiments a nose 40 is arranged in front of the propellers 41 and 42.

In the view of FIG. 1 the upper and lower drifts, or vertical tail planes, 33 provided with respective rudders 34 are also visible.

Advantageously, the wings 31 and the drifts 33 are provided with wheels 35 that allow the aircraft 10 to rest on the ground with the tail section, as visible for example in the following FIGS. 2-4. In preferred embodiments the wheels 35 are located at respective ends of wings and drifts distal with respect to the cockpit 20.

Figure 2:
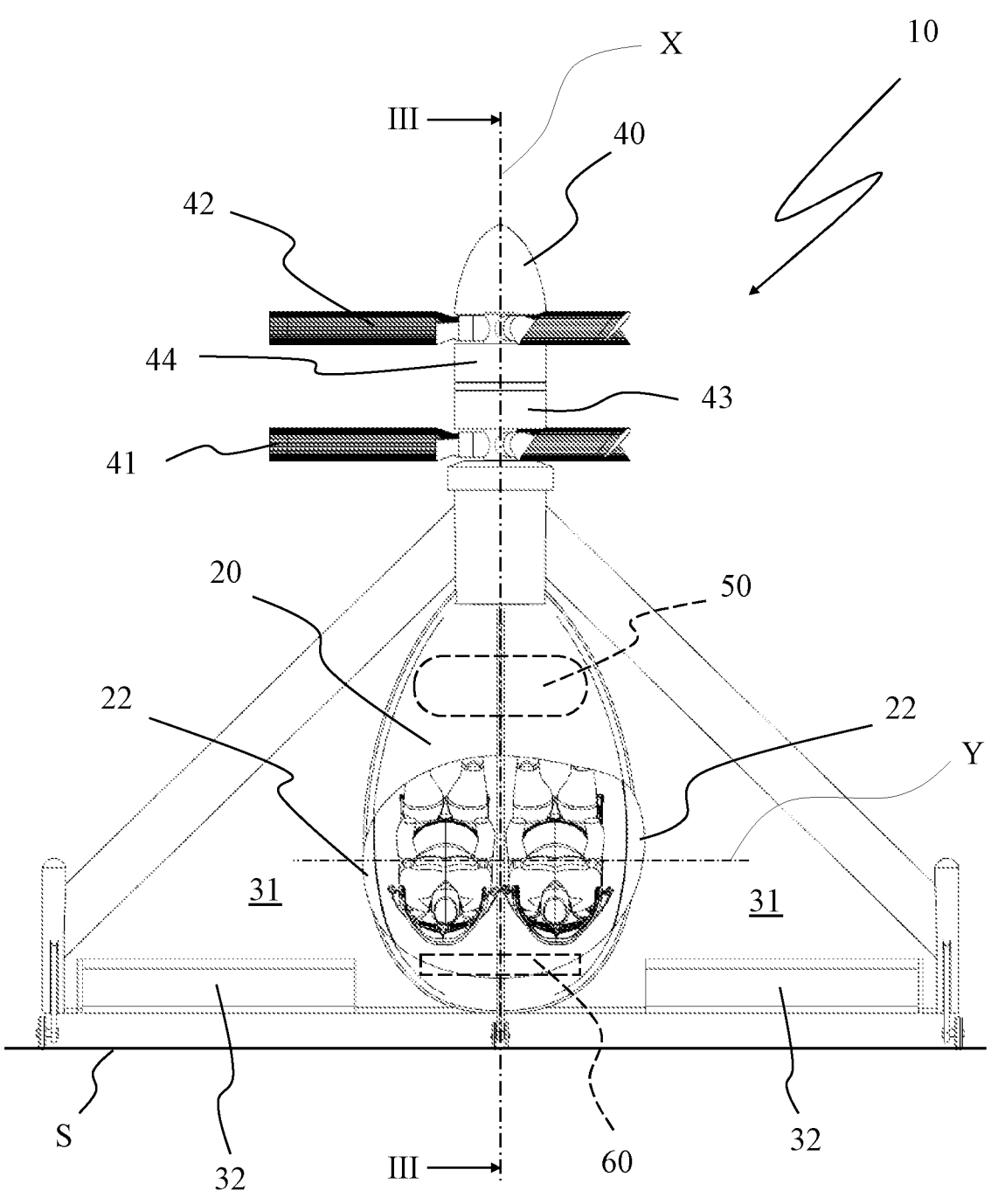
FIG. 2 is an elevational view of the aircraft of FIG. 1, sitting on the ground with its tail.

FIG. 2 illustrates an elevational view of the aircraft 10 in the vertical position resting on the ground S with the tail section. The two side-by-side seats in the cockpit 20 are highlighted, which are accessed by tilting a transparent shell 22 (FIG. 4) placed on each of the access sides to the cockpit 20.

A programmable control unit 50 is also highlighted, with interface placed in the cockpit 20, which allows to control and adjust various functions of the aircraft 10, such as for example the power of the electric engines 43 and 44, the state of charge of the batteries, the flight attitude of the aircraft 10, the phases of transition between vertical flight and horizontal flight, the route to be followed by the aircraft 10 and, in general, all the signalling functions and the automations that allow the flight of the aircraft 10 in safe conditions.

Airbags 60 are preferably provided in the cockpit 20 as further safety systems for the occupants of the aircraft 10.

Figure 3:
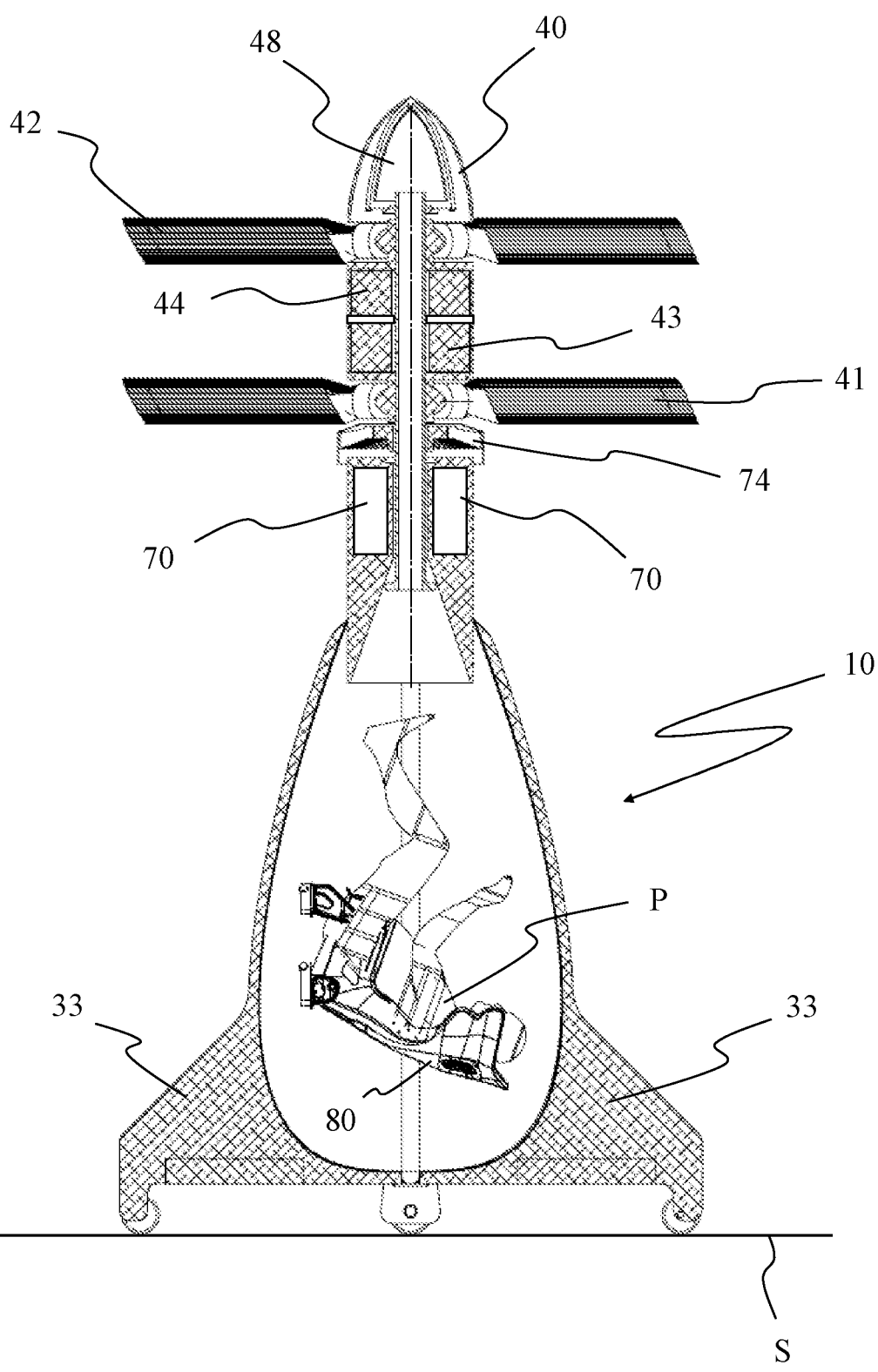
FIGS. 3 and 3A are a sectional view of the aircraft according to plane III-III of FIG. 2 and a respective detailed view.
Figure 3A:

In the sectional view of FIG. 3 and in the relative detail of FIG. 3A, the electric engines 43 and 44 and the arrangement of the battery unit 7, as well as of relative rechargeable solid state batteries 70, responsible for their supply are highlighted. The electric engines 43 and 44 can be for example brushless type direct current engines installed with fixed windings 43A, 44A and rotating casings 43B, 44B, each of the casings being mechanically connected to a respective propeller 41 and 42.

In preferred embodiments, the rotating casings of each engine, which form the rotor thereof, are directly connected to the respective propeller. In other words, the propellers are in direct drive with the respective engine, without interposition of gear reducers or other motion transmission systems.

In some embodiments the windings 43A, 44A, which more generally define stator units of the motor, are arranged between the two propellers.

In some embodiments, not illustrated in the figures, the two engines may use a single stator unit comprising a support on which the windings 43A, 44A of each engine are fixed. In this way, a common cooling circuit can be used for the two windings, always for the benefit of simplicity of construction and ease of assembly.

As can best be noted from FIG. 3A, in preferred embodiments the two electric engines comprise a first electric engine 43 and a second electric engine 44, arranged in front of the first electric engine 43.

Preferably the engines 43 and 44 are aligned with respect to the axis of rotation X of the propellers 41, 42, with the second engine 44 directly facing the first engine 43.

The aircraft 10 may further comprise a shaft 45 which develops parallel to the axis of rotation X on which the stator units of the engines 43, 44 are supported.

In preferred embodiments, the battery unit 7 comprises a battery housing body 71 within which the batteries 70 are housed.

The shaft 45 preferably extends from the battery housing body 71, on which it is supported at a first end 45A. The battery housing body 71 is in turn supported on the cockpit 20.

According to one aspect of the invention, the propellers 41 and 42 are also supported on the shaft 45, by means of respective bearings, not illustrated in the figure.

The shaft 45 can also be hollow so as to allow the passage of the electrical connections, not illustrated in the figure, which allow both to supply power to the engines, and to manage the control of the same.

In some embodiments, a cooling system 74, preferably with liquid, is arranged between the engines 43, 44 and the battery housing body 71 to cool the engines and/or the batteries in combination with the airflow generated by the propellers 41 and 42 during the flight.

In fact, it should be noted that the battery housing body 71, the cooling system 74 and the engines 43, 44 are aligned along the axis of rotation X, and follow one another in said order along a direction running from the rear to the front of the aircraft 10.

Advantageously, the first propeller 41 is also interposed between the cooling system 74 and the first engine 43.

In the nose 40 there is obtained a housing 48 containing at least one ballistic safety parachute that can be operated in case of malfunction of the aircraft 10 to guarantee a descent at reduced speed and the subsequent tail contact with the ground.

The shaft 45 may advantageously comprise a second end 45b projecting in axial direction with respect to the second propeller 44 so as to allow the fixing of the nose 40.

It will be appreciated that the cockpit 20, the battery unit 7, the cooling system 74, and the propulsion system formed by propellers 41, 42 and engines 43, 44, may be made as distinct components.

When assembling the aircraft, these components can be assembled according to the axial succession described above, possibly in combination by means of the shaft 45.

In the view of FIG. 3 a pilot P is illustrated sitting on a seat 80 which is in the position it assumes during the flight. Each seat 80 in the cockpit 20 is a tiltable seat that can be operated and adjusted on command in rotation. In fact, as illustrated in FIG. 4, to allow the pilot P, and any passenger, to access or leave the cockpit 20, the seat 80 is in a suitable position to allow the pilot P and any passenger to be seated, who access the cockpit 20 after having tilted the respective transparent shell 22. The latter is then safely reclosed before the flight begins.

For this purpose it can be envisaged that the seat can rotate about an axis Y, illustrated in FIG. 2, substantially perpendicular to the axis of rotation X and substantially parallel to the ground when the aircraft is resting thereon on the wheels 35.

Figure 4:
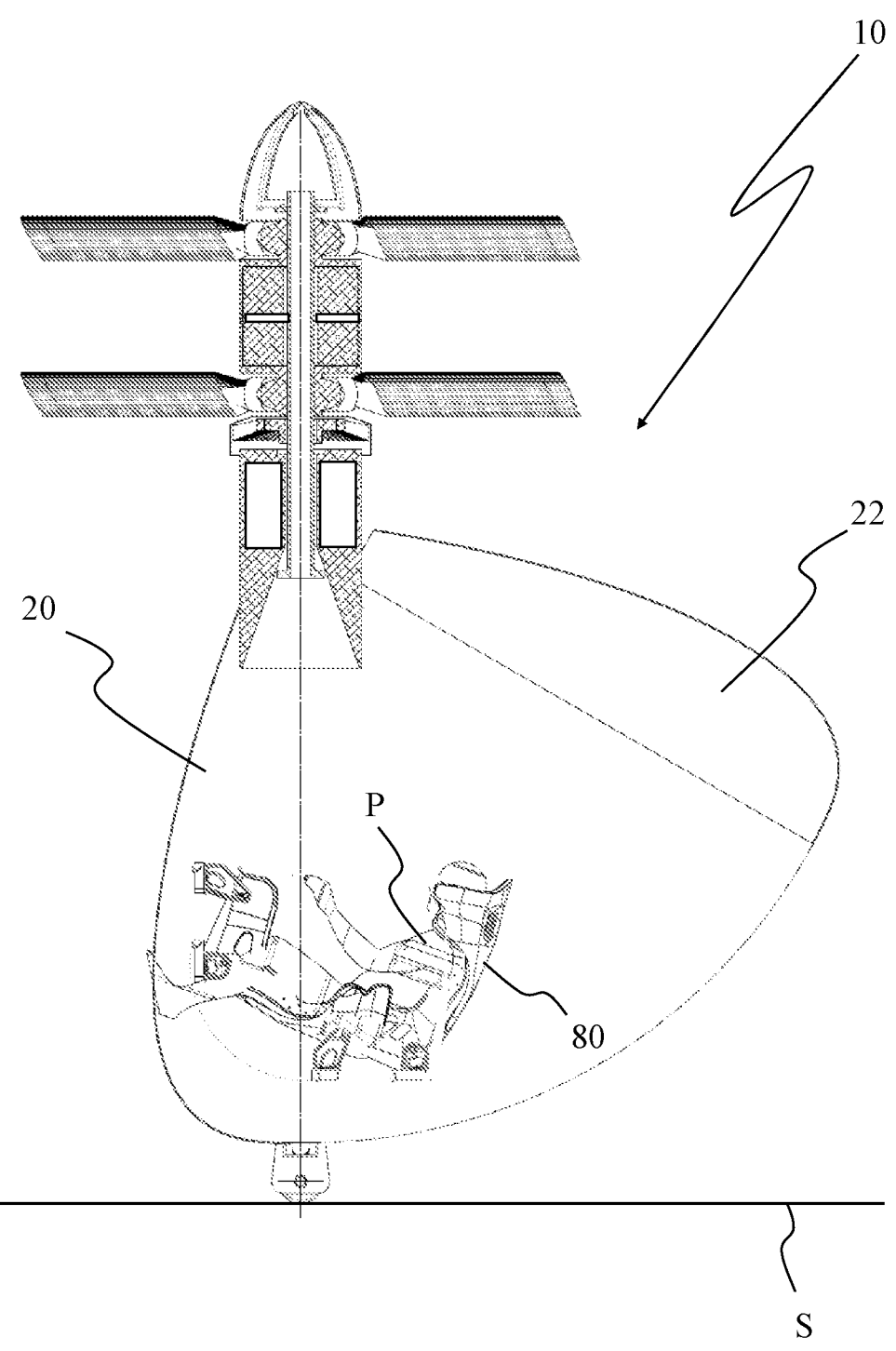
FIG. 4 is a schematic view illustrating the detail of the cockpit in the shell opening condition.

The take-off phase can then take place, with the aircraft 10 resting on the ground S on the wheels 35, with the seat 80 in a rotated position, i.e. with the passenger positioned seated, with essentially standing torso, i.e. substantially aligned with the vertical, as schematically illustrated in FIG. 4.

After take-off, the seat 80 can be rotated about the aforementioned axis Y to bring the seated passenger back into alignment with the vertical.

It will be appreciated that this feature makes the aircraft of the present invention more easily usable, facilitating access and making the cruising phases comfortable.

The aircraft 10 may further comprise a pitch varying device 47 of the propellers, illustrated only schematically in FIG. 3A, preferably configured to act during the transition between take-off/landing and horizontal flight phase.

The pitch varying device may act so as to individually vary the pitch of each of the propellers by adjusting the propulsive thrust of the propellers without varying their number of turns.

This allows to have a greater thrust during take-off/landing and a lower thrust during flight, thus allowing to increase the autonomy of the aircraft.

Various modifications may be made to the embodiments described and depicted hereinabove. For example, the arrangement of engines and batteries in the aircraft may also be different from that described so far in the various embodiments, as well as the arrangement of airbags within the cockpit and/or the arrangement of the cooling system of engines and batteries.

The invention claimed is:

1. A vertical take-off and landing aircraft of the tail-sitting type, comprising:
   a cockpit integrated in a body having delta wings in a rear section with respect to the cockpit; and
   a propulsion system placed in a front section with respect to the cockpit,
   wherein the propulsion system includes;
      at least a pair of coaxial counter-rotating propellers put in rotation by a respective pair of distinct electric engines, including a first engine and a second engine, the second engine being directly facing the first engine and
      being powered by a battery unit comprising rechargeable batteries,
      wherein each of said electric engines is configured so as to put into rotation a respective propeller of said pair of counter-rotating propellers, wherein said propellers are coaxial with respect to an axis of rotation (X),
   said engines being aligned with respect to said axis of rotation (X),
   said propellers being in direct drive with the respective engine, without interposition of gear reducers,
   wherein the batteries are housed in a battery housing body supported on said cockpit,
   the vertical take-off and landing aircraft further comprising a cooling system configured to cool the electric engines and/or the rechargeable batteries,
   wherein said battery housing body, said cooling system and said propulsion system are aligned along the axis of rotation (X), and
   follow one another in that order in an axial succession along a direction running from the rear to the front of the aircraft,
   wherein said cockpit, said battery unit, and said propulsion system formed by the pair of propellers and the pair of engines, are each a distinct component in a form of an individual module, and are configured so as to be mounted in the axial succession.

2. The aircraft according to claim 1, wherein said electric engines are direct current powered brushless type engines.

3. The aircraft according to claim 1, further comprising a pitch varying device of said propellers, said pitch varying device being configured so as to individually vary the pitch of each of said propellers.

4. The aircraft according to claim 1, wherein said rechargeable batteries are solid state batteries.

5. The aircraft according to claim 1, wherein a first propeller of said pair is interposed between said cooling system and said first engine.

6. The aircraft according to claim 1, wherein said cooling system is made as a distinct component with respect to said cockpit, said battery unit, and said propulsion system, and is configured so as to be mounted between said battery unit and said propulsion system.

7. The aircraft according to claim 1, wherein one or more airbags are arranged in the rear section of the body of the aircraft and/or of the cockpit to cushion the impact with the ground in the event of any emergency landing.

8. The aircraft according to claim 1, wherein said cockpit comprises at least two side-by-side seats.

9. The aircraft according to claim 1, wherein said cockpit comprises at least one transparent tiltable shell, hinged in its front part to the body of the aircraft.

10. The aircraft according to claim 1, wherein at least the body of the aircraft is made with materials comprising carbon fibres, aluminium or alloys thereof and titanium or alloys thereof.

11. The aircraft according to claim 1, further comprising a nose placed before said two coaxial counter-rotating propellers, wherein at least one ballistic safety parachute is housed in said nose.

12. The aircraft according to claim 11, the aircraft further comprising a shaft that develops substantially parallel to the axis of rotation (X) on which said windings of said engines are supported, wherein said shaft comprises a second end projecting in axial direction with respect to a respective propeller of said pair, said nose being supported on said second end.

13. The aircraft according to claim 1, wherein said cockpit comprises at least one tilting seat, said tilting seat being configured such that it rotates on command about an axis (Y) substantially perpendicular to said axis of rotation (X) of said propellers and substantially parallel to the ground(S) when the aircraft is resting on the ground in a take-off/landing configuration.

14. The aircraft according to claim 13, wherein said cockpit comprises at least two side-by-side seats and said at least two side-by-side seats comprise at least two tilting seats with adjustable rotation.

15. The aircraft according to claim 13, wherein the aircraft comprises a programmable control unit for controlling and adjusting one or more of:

the power of said at least two electric engines;
the rotation of said tilting seat;
the pitch of said propellers;
the state of charge of said batteries;
the flight attitude of the aircraft;
the phases of transition between vertical flight and horizontal flight; and
the route to be followed by the aircraft.

16. The aircraft according to claim 1, wherein said electric engines have fixed windings and rotating casing.

17. The aircraft according to claim 16, wherein each engine comprises a respective rotating casing, each casing being directly connected to a respective propeller.

18. The aircraft according to claim 16, the aircraft further comprises a shaft that develops substantially parallel to the axis of rotation (X on which said windings of said engines are supported, wherein said cooling system is supported on said shaft.

19. The aircraft according to claim 18, wherein said shaft is hollow, and wherein said cooling system comprises ducts for the passage of cooling liquid that develop inside said shaft.

20. The aircraft according to claim 16, wherein said propellers are coaxial with respect to an axis of rotation (X), the aircraft further comprising a shaft that develops substantially parallel to the axis of rotation (X) on which said windings of said engines are supported.

21. The aircraft according to claim 20, wherein said shaft extends from the battery housing body, said shaft being supported on said housing body at a first end of said shaft.

22. The aircraft according to claim 20, wherein each propeller of said pair is supported on said shaft.

23. The aircraft according to claim 20, wherein said shaft is hollow.

\* \* \* \* \*